United States Patent
Raya et al.

(10) Patent No.: US 10,941,846 B2
(45) Date of Patent: Mar. 9, 2021

(54) DIFFERENTIAL ASSEMBLY HAVING AN OVERHANGING RING GEAR

(71) Applicant: ArvinMeritor Technology, LLC, Troy, MI (US)

(72) Inventors: Dhanapal Vittala Raya, Troy, MI (US); I-Chao Chung, Troy, MI (US); Tao Peng, Canton, MI (US); Kristen G. Byrd, Dearborn, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 86 days.

(21) Appl. No.: 16/398,847

(22) Filed: Apr. 30, 2019

(65) Prior Publication Data

US 2020/0347922 A1 Nov. 5, 2020

(51) Int. Cl.
*F16H 48/38* (2012.01)
*F16H 48/40* (2012.01)

(52) U.S. Cl.
CPC .............. *F16H 48/38* (2013.01); *F16H 48/40* (2013.01); *F16H 2048/385* (2013.01)

(58) Field of Classification Search
CPC ..... F16H 48/38; F16H 48/40; F16H 2048/385
See application file for complete search history.

(56) References Cited

U.S. PATENT DOCUMENTS

| | | | |
|---|---|---|---|
| 2,978,921 A * | 4/1961 | Donohoe | F16H 55/12 74/447 |
| 6,068,571 A * | 5/2000 | Irwin | F16H 55/20 475/230 |
| 6,116,108 A | 9/2000 | Sturm | |
| 6,409,626 B1 | 6/2002 | Irwin | |
| 6,569,053 B2 | 5/2003 | Hirao et al. | |
| 7,775,928 B2 | 8/2010 | Zink | |
| 8,327,541 B2 | 12/2012 | Harrup et al. | |
| 10,012,302 B2 * | 7/2018 | Kiten | F16H 48/08 |
| 2005/0009662 A1 * | 1/2005 | Sudou | F16H 48/08 475/231 |
| 2019/0054816 A1 | 2/2019 | Garcia et al. | |

FOREIGN PATENT DOCUMENTS

| | | |
|---|---|---|
| DE | 100 15 692 A1 | 11/2000 |
| EP | 3 128 208 A2 | 2/2017 |
| JP | 02097748 A * | 4/1990 |

OTHER PUBLICATIONS

Raya, et al., U.S. Appl. No. 16/205,586, filed with the U.S. Patent and Trademark Office on Nov. 30, 2018.
Extended European Search Report dated Aug. 18, 2020 for related European Application No. 20171585.1; 8 Pages.

* cited by examiner

*Primary Examiner* — Ernesto A Suarez
*Assistant Examiner* — James J Taylor, II
(74) *Attorney, Agent, or Firm* — Brooks Kushman PC (57) ABSTRACT

A differential assembly having a case and a ring gear. The ring gear is mounted to the case and may include a mounting flange and a set of teeth. The mounting flange may have a fastener hole. The set of teeth overhangs the fastener hole such that the set of teeth extend further toward the axis than at least a portion of the fastener hole.

21 Claims, 5 Drawing Sheets

DIFFERENTIAL ASSEMBLY HAVING AN OVERHANGING RING GEAR

TECHNICAL FIELD

This disclosure relates to a differential assembly having an overhanging ring gear.

BACKGROUND

A differential assembly is disclosed in U.S. Pat. No. 8,327,541.

SUMMARY

In at least one embodiment, a differential assembly is provided. The differential assembly may include a case, a ring gear, and a fastener. The case may be rotatable about an axis and may have a through hole. The ring gear may be mounted to the case. The ring gear may include a mounting flange and a set of teeth. The mounting flange may engage the case and may have a fastener hole. The set of teeth may extend from an inner side of the ring gear that faces toward the axis toward an outer side of the ring gear that faces away from the axis. The set of teeth may overhang the fastener hole such that the inner side may be located closer to the axis than at least a portion of the fastener hole. The fastener may be received in the through hole and the fastener hole and may couple the ring gear to the case.

In at least one embodiment, a differential assembly is provided. The differential assembly may include a case, a ring gear, and a fastener. The case may be rotatable about an axis and may have a through hole. The ring gear may be mounted to the case. The ring gear may include a mounting flange and a set of teeth. The mounting flange may engage the case and may have a fastener hole. The set of teeth may be arranged around the axis. The set of teeth may overhang the fastener hole such that the set of teeth extends further toward the axis than at least a portion of the fastener hole. The fastener may be received in the through hole and the fastener hole and may couple the ring gear to the case.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
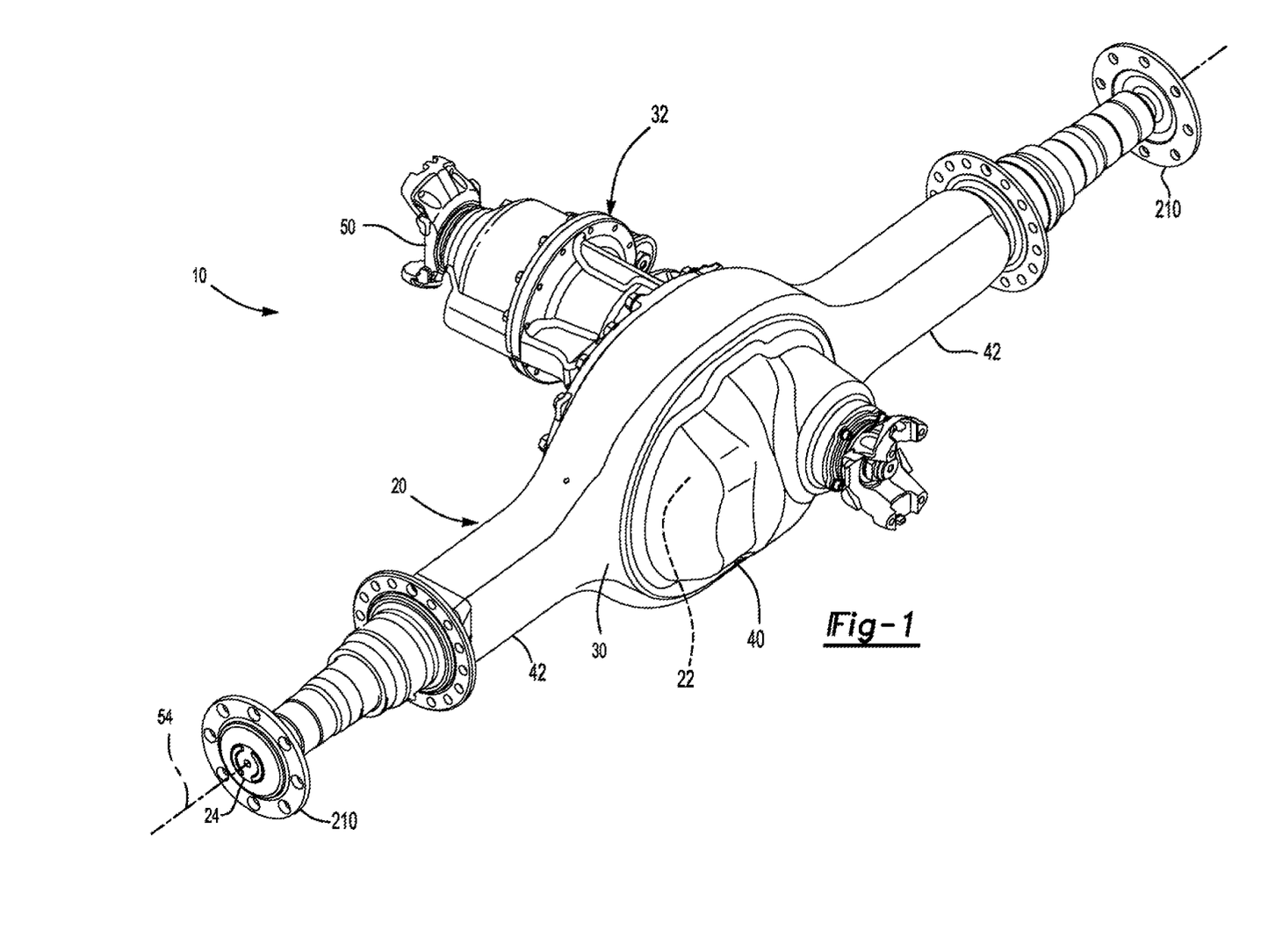
FIG. 1 is a perspective view of an axle assembly having a differential assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series. As is best shown with reference to FIGS. 1 and 2, the axle assembly 10 may include a housing assembly 20, a differential assembly 22, and at least one axle shaft 24.

Referring to FIG. 1, the housing assembly 20 may receive various components of the axle assembly 10. In addition, the housing assembly 20 may facilitate mounting of the axle assembly 10 to the vehicle. The housing assembly 20 may include an axle housing 30 and a differential carrier 32.

The axle housing 30 may receive and support the axle shafts 24. In at least one configuration, the axle housing 30 may include a center portion 40 and one or more arm portions 42.

The center portion 40 may be disposed proximate the center of the axle housing 30. The center portion 40 may define a cavity that may receive the differential assembly 22. The center portion 40 may include a carrier mounting surface. The carrier mounting surface may face toward and may engage the differential carrier 32. The carrier mounting surface may facilitate mounting of the differential carrier 32 to the axle housing 30. For example, the carrier mounting surface may have a set of holes that may be aligned with corresponding holes on the differential carrier 32. Each hole may receive a fastener, such as a bolt, that may couple the differential carrier 32 to the axle housing 30.

One or more arm portions 42 may extend from the center portion 40. For example, two arm portions 42 may extend in opposite directions from the center portion 40 and away from the differential assembly 22. The arm portions 42 may have substantially similar configurations. For example, the arm portions 42 may each have a hollow configuration or tubular configuration that may extend around the corresponding axle shaft 24 and may help separate or isolate the axle shaft 24 from the surrounding environment. An arm portion 42 or a portion thereof may be integrally formed with the center portion 40. Alternatively, an arm portion 42 may be separate from the center portion 40. In such a configuration, each arm portion 42 may be attached to the center portion 40 in any suitable manner, such as by welding or with one or more fasteners. Each arm portion 42 may define an arm cavity that may receive a corresponding axle shaft 24.

The differential carrier 32, which may also be called a carrier housing, may be mounted to the center portion 40 of the axle housing 30. The differential carrier 32 may support components of the differential assembly 22. For example, the differential carrier 32 may have one or more bearing supports that may receive or support a roller bearing assembly that may rotatably support the differential assembly 22.

Figure 2:
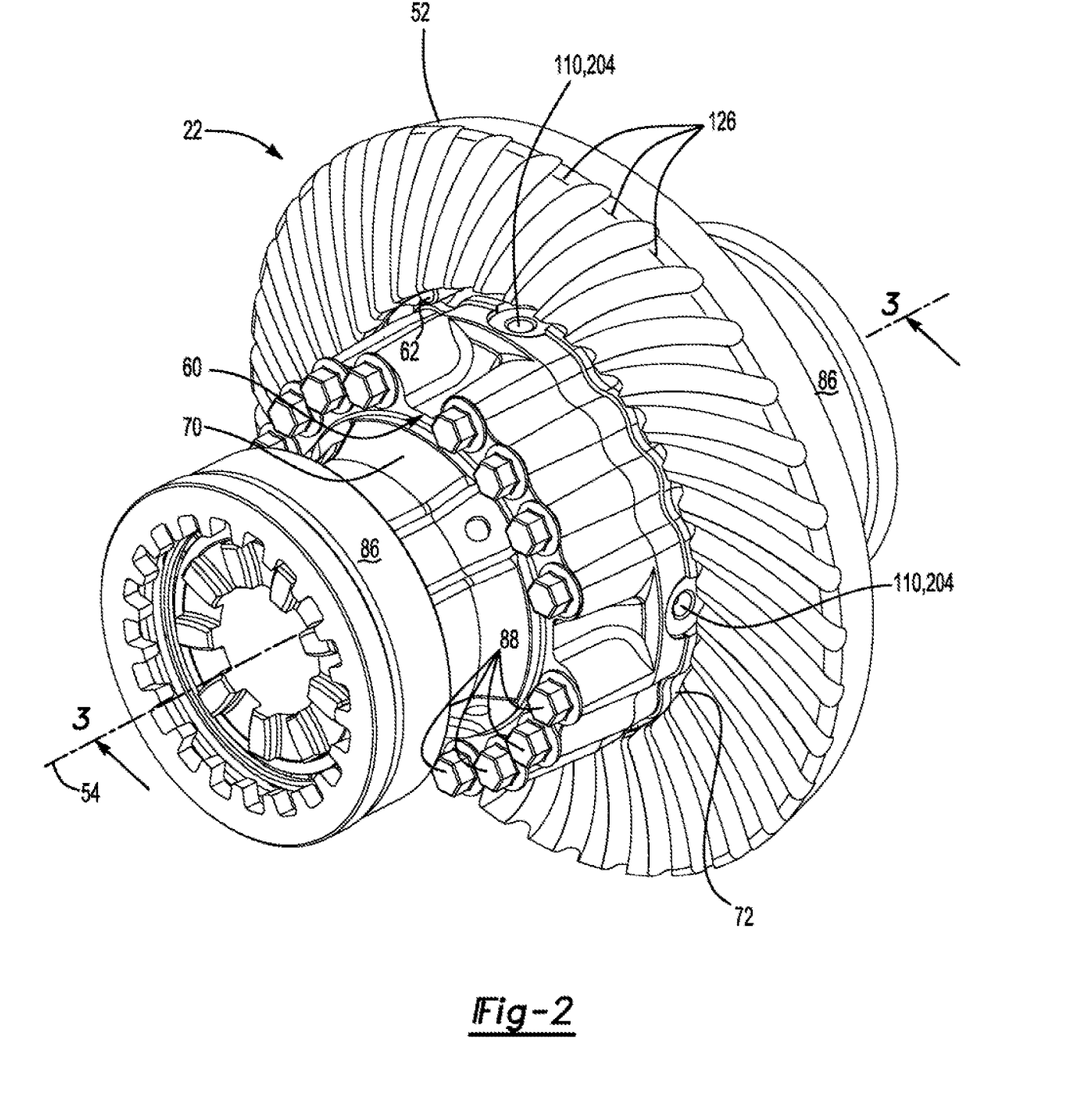
FIG. 2 is a perspective view of the differential assembly and bearing assemblies that rotatably support the differential assembly.

An input yoke 50, if provided, may be coupled to a vehicle drivetrain component, such as a drive shaft, that may be coupled to an output of a vehicle transmission or transfer case, which in turn may receive torque from a vehicle power source, such as an engine or motor. Alternatively, the input yoke 50 may be operatively connected to an output of another axle assembly. The input yoke 50 may be connected to or integrally formed with an input shaft that may be rotatably supported by one or more roller bearings that may be disposed on the differential carrier 32. The input shaft may be operatively connected to a drive pinion or may be integrally formed with the drive pinion. The drive pinion may provide torque to a ring gear 52, which is best shown in FIG. 2, that may be provided with the differential assembly 22 as will be discussed in more detail below. For example, the drive pinion may have teeth that mesh with teeth of the ring gear 52 such that rotation of the drive pinion may rotate the differential assembly 22 about an axis 54. The differential assembly 22 may be operatively connected to the axle shafts 24. As such, the differential assembly 22 may receive torque via the ring gear 52 and provide torque to the axle shafts 24.

It is also contemplated that the axle assembly 10 may be provided in configurations that may not include an input yoke. For example, the axle assembly 10 may include an electric motor module. The electric motor module may be operatively connected to the differential assembly and may provide torque to the differential assembly. For example, the electric motor module may be operatively connected to the differential assembly and may provide torque to the differential assembly via the drive pinion. Examples of axle assemblies that have an electric motor module are disclosed in U.S. Patent Publication No. 2019/0054816 and U.S. patent application Ser. No. 16/205,586, which are hereby incorporated by reference in their entirety.

Figure 3:
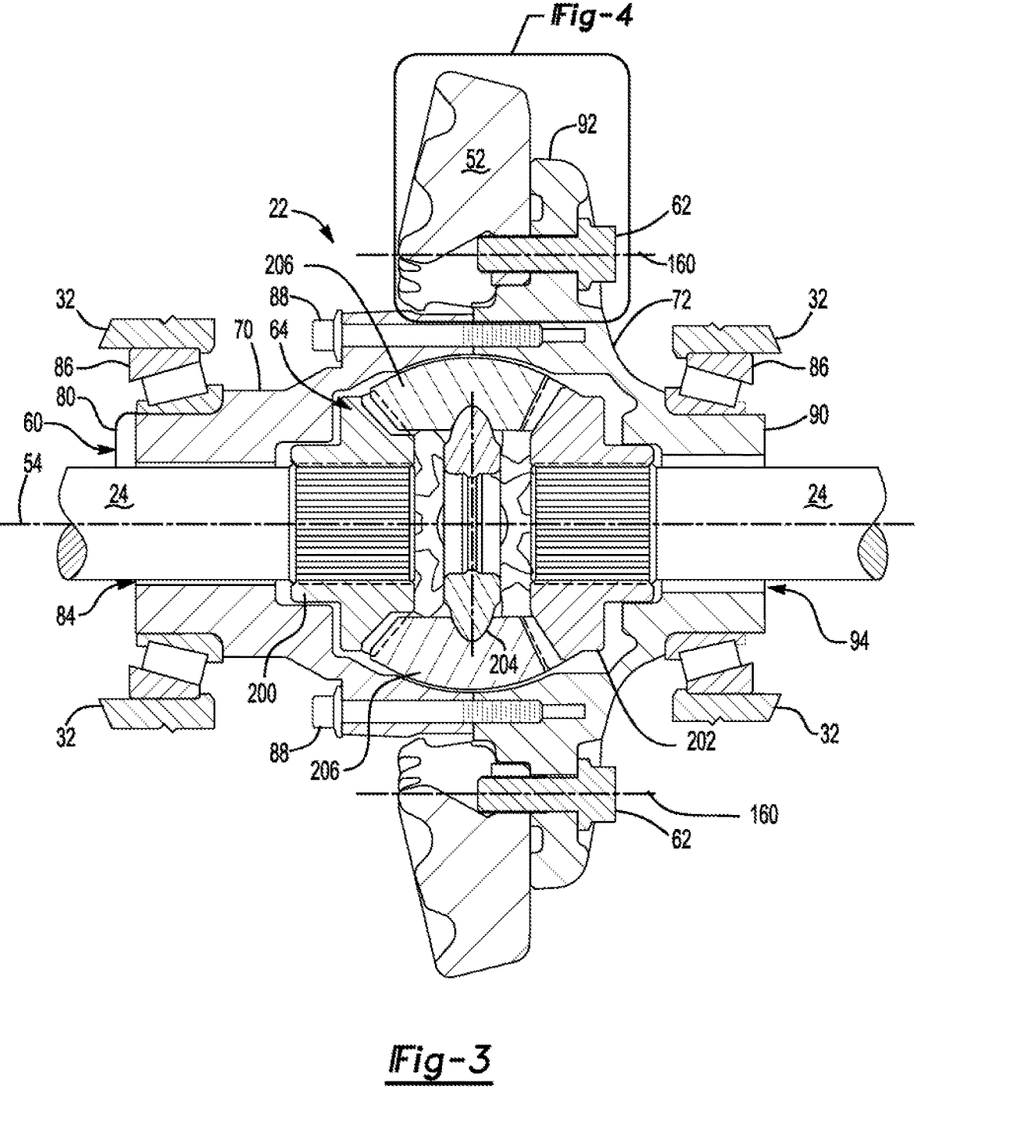
FIG. 3 is a section view along section line 3-3 that also includes axle shafts that may be associated with the differential assembly.

Referring to FIGS. 2 and 3, an example of a differential assembly 22 is shown. The differential assembly 22 may be disposed in the center portion 40 of the housing assembly 20. The differential assembly 22 may transmit torque to the vehicle traction wheel assemblies and permit the traction wheel assemblies to rotate at different velocities. In addition to the ring gear 52, the differential assembly 22 may include a case 60, at least one fastener 62, and a differential unit 64.

The case 60 may be configured to receive components of the differential assembly 22. In addition, the case 60 may be rotatable about the axis 54. In at least one embodiment, the case 60 may include a first case portion 70 and a second case portion 72 that may cooperate to at least partially define a cavity. The cavity may at least partially receive the differential unit 64.

Referring to FIG. 3, the first case portion 70 may include a first bearing portion 80. The first bearing portion 80 may extend around the axis 54. In addition, the first bearing portion 80 may extend around and may at least partially define a first hole 84 through which an axle shaft 24 may extend. The first bearing portion 80 may be received in a roller bearing assembly 86 that may rotatably support the first case portion 70. The roller bearing assembly 86 may be mounted to the differential carrier 32.

The second case portion 72 may be mounted on the first case portion 70. For example, the second case portion 72 may be fixedly disposed at an end of the first case portion 70 with a weld or one or more fasteners 88, such as bolts, so that the second case portion 72 may not rotate or move with respect to the first case portion 70. In at least one configuration, the second case portion 72 may include a second bearing portion 90 and a case mounting flange 92.

The second bearing portion 90 may extend around the axis 54. In addition, the second bearing portion 90 may extend around and may at least partially define a second hole 94 through which another axle shaft 24 may extend. The second bearing portion 90 may be received in a roller bearing assembly 86 that may rotatably support the second case portion 72. The roller bearing assembly 86 may be mounted to the differential carrier 32.

The case mounting flange 92 may be axially positioned between the first case portion 70 and the second bearing portion 90. The case mounting flange 92 may extend continuously around the axis 54 and may extend away from the axis 54. The case mounting flange 92 may facilitate mounting of the ring gear 52. In at least one configuration, the case mounting flange 92 may include a plurality of through holes 100, which are best shown in FIG. 4.

The through holes 100 may be arranged around the axis 54 and may facilitate mounting of the ring gear 52 as will be discussed in more detail below. The through holes 100 may be spaced apart from each other and may be disposed at the same radial distance from the axis 54 in one or more configurations. The through holes 100 may or may not be threaded.

Referring to FIG. 2, one or more spider shaft holes 110 may be provided in the first case portion 70, the second case portion 72, or both. In the configuration shown, the first case portion 70 and the second case portion 72 cooperate to define one or more spider shaft holes 110. A spider shaft hole 110 may receive a shaft of the spider of the differential unit 64 as will be discussed in more detail below.

Figure 4:
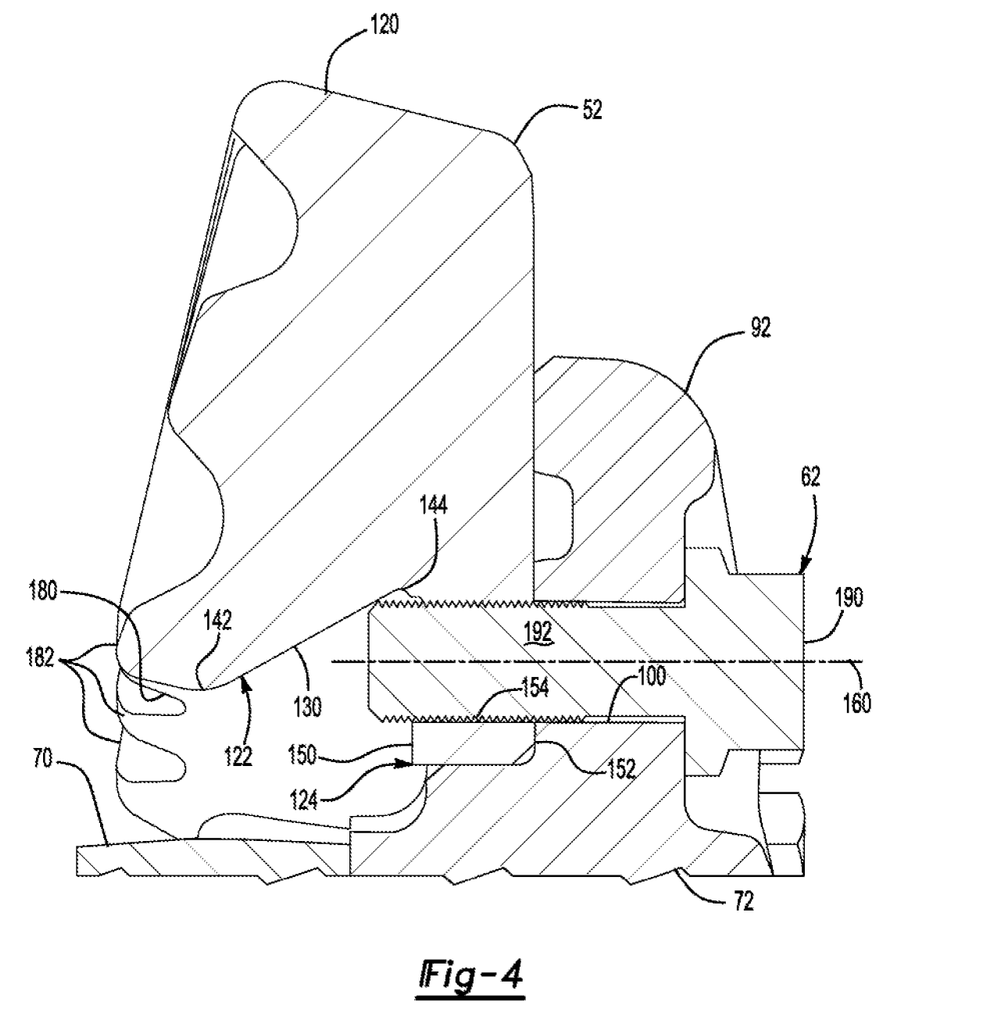
FIG. 4 is a magnified view of a portion of FIG. 3 showing a cross section of a ring gear.

Referring to FIGS. 2-4, the ring gear 52 may be fixedly mounted to the case 60. As is best shown in FIG. 3, the ring gear 52 may be disposed on the case mounting flange 92 and may be oriented such that the teeth of the ring gear 52 may face toward or extend toward the first case portion 70, or to the left from the perspective shown. In at least one configuration and as is best shown with reference to FIG. 4, the ring gear 52 may include an outer side 120, an inner side 122, a mounting flange 124, and a set of teeth 126.

The outer side 120 may face away from the axis 54. In addition, the outer side 120 may extend continuously around the axis 54.

The inner side 122 may be disposed opposite the outer side 120. As such, the inner side 122 may face toward the axis 54. The inner side 122 may extend continuously around the axis 54 and may be spaced apart from the case 60. As such, the inner side 122 may at least partially define a hole or opening that may receive the case 60. In addition, the inner side 122 may extend in an axial direction from the mounting flange 124 toward the set of teeth 126 and may partially define the set of teeth 126. In at least one configuration, the inner side 122 may include an angled surface 130.

The angled surface 130 may face toward the axis 54 and may be disposed at an angle with respect to the axis 54. For example, the angled surface 130 may extend at an oblique angle with respect to the axis 54 and the mounting flange 124. The angled surface 130 may have a first end 142 and a second end 144.

The first end 142 may be disposed closer to the set of teeth 126 than the second end 144. In addition, the first end 142 may be disposed closer to the axis 54 than the second end 144. In at least one configuration, the first end 142 may define a location or annular location where the inner side 122 is located closest to the axis 54.

The second end 144 may be disposed closer to the mounting flange 124 than the first end 142. In the configuration shown in FIG. 4, the second end 144 is disposed adjacent to or may extend from the mounting flange 124. In at least one configuration the second end 144 may be located where the inner side 122 is located furthest from the axis 54.

The mounting flange 124 may extend in a radially inward direction toward the axis 54 and may extend further toward the axis 54 than the inner side 122. In addition, the mounting flange 124 may engage the case 60 and may facilitate mounting of the ring gear 52 to the case 60 as will be discussed in more detail below. In at least one configuration, the mounting flange 124 may include a first side 150, a second side 152, and a fastener hole 154.

The first side 150 may face toward the set of teeth 126. In at least one configuration, the first side 150 or a portion thereof may be disposed substantially perpendicular to the axis 54.

The second side 152 may be disposed opposite the first side 150. In addition, the second side 152 may engage or contact the case 60. For instance, the second side 152 may engage or contact the case mounting flange 92 and may extend to the outer side 120. The second side 152 or a portion thereof may be disposed substantially perpendicular to the axis 54 in one or more configurations. As such, the angled surface 130 may be disposed at an oblique angle with respect to the first side 150, the second side 152, or both.

The fastener hole 154 may extend from the first side 150 to the second side 152. As such, the fastener hole 154 may be a through hole that may extend through the mounting flange 124. In addition, the fastener hole 154 may be threaded. The fastener hole 154 may extend along and may be centered about a fastener hole axis 160. The fastener hole axis 160 may be disposed parallel to the axis 54.

Figure 5:
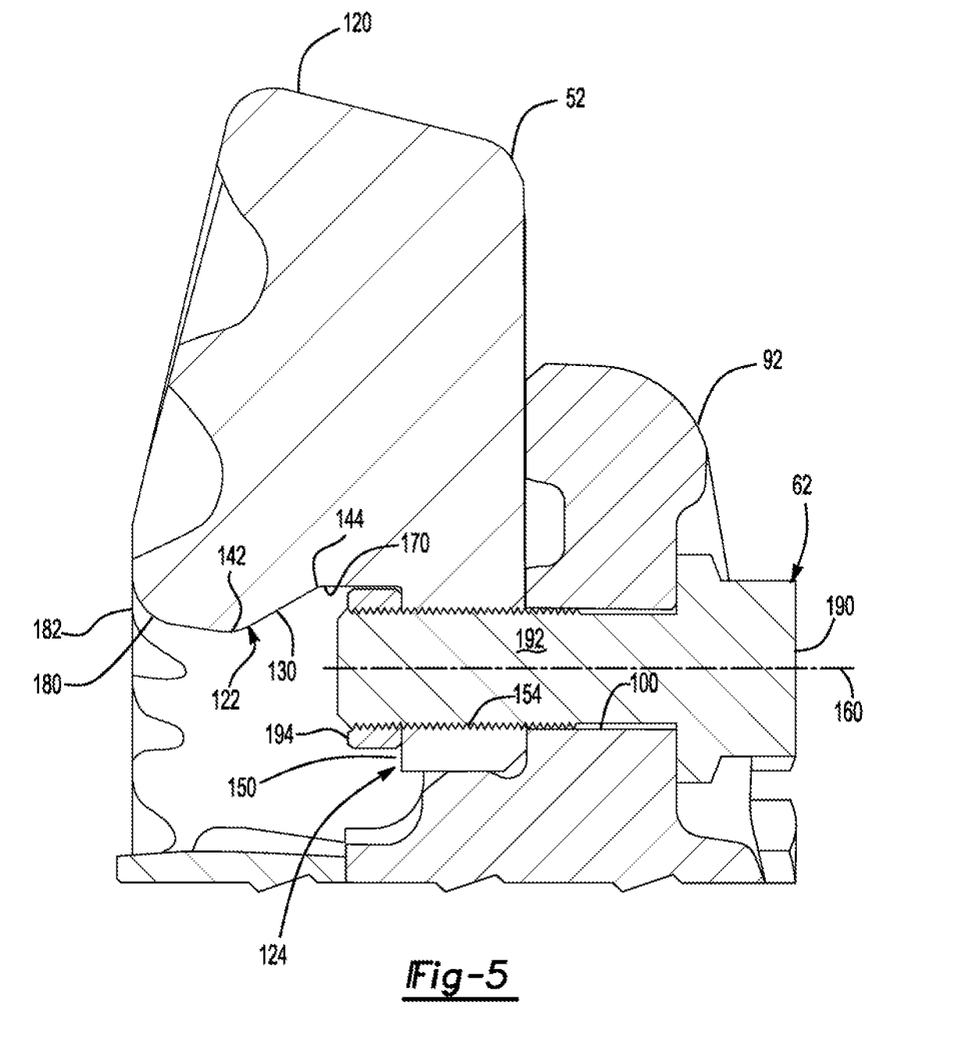
FIG. 5 is a magnified view of showing another cross section of a ring gear.

The ring gear 52 and the inner side 122 may be provided with different configurations. Referring to FIGS. 4 and 5, two examples are shown. In the configuration shown in FIG. 4, the inner side 122 extends further toward the axis 54 than the fastener hole axis 160. In the configuration shown in FIG. 5, the fastener hole axis 160 is located closer to the axis 54 than the inner side 122. However, in both configurations the positioning of the inner side 122 is such that the inner side 122 and the set of teeth 126 overhangs the fastener hole 154. Such an overhanging configuration may allow the length of the teeth in a direction that extends from the outer side 120 to the inner side 122 to be increased without increasing the outside diameter of the ring gear 52. Increasing the outside diameter of the ring gear 52 would increase the size, weight, and cost of the ring gear 52 and increase the amount of space in an axle housing needed to accommodate the ring gear 52.

In the configuration shown in FIG. 4, the angled surface 130 is configured such that the second end 144 of the angled surface 130 extends from the first side 150 of the mounting flange 124. In the configuration shown in FIG. 5, the second end 144 of the angled surface 130 is separated from the mounting flange 124 by an intermediate surface 170. The intermediate surface 170 may extend from an end of the first side 150 of the mounting flange 124 and may be disposed parallel to the axis 54 in one or more embodiments. The angled surface 130 may extend from an end of the intermediate surface 170 that may be disposed opposite the mounting flange 124 and thus the angled surface 130 may be spaced apart from the mounting flange 124 in such a configuration. The configuration shown in FIG. 4 may help increase the thickness of the set of teeth 126 and may facilitate extending the teeth further toward the axis 54 as compared to the configuration shown in FIG. 5. The configuration shown in FIG. 5 may provide increased clearance to a fastener 62 and may help reduce the weight of the ring gear 52 by decreasing the length of the angled surface 130 and allowing less material to be provided proximate the intermediate surface as compared to extending the angled surface 130 to the mounting flange 124.

Referring primarily to FIG. 4 or 5, the set of teeth 126 may be arranged around the axis 54. Members of the set of teeth 126 may have any suitable configuration. For example, the teeth may have a spiral configuration, helical configuration, hypoid configuration, straight configuration, and so on. The set of teeth 126 may extend from an inner side 122 toward an outer side 120 of the ring gear 52 or to the outer side 120 of the ring gear 52.

The set of teeth 126 may overhang the fastener holes 154. For example, the set of teeth 126 may extend further toward the axis 54 than at least a portion of the fastener hole 154. As such, at least a portion of the inner side 122 may be located closer to the axis 54 than at least a portion of the fastener holes 154. The set of teeth 126 may overhang the fastener holes 154 in a manner that prevents a fastener 62 from being inserted into a fastener hole 154 from the tooth side of the ring gear 52 or from left to right from the perspective shown. As such, the set of teeth 126 may prevent a fastener 62 from being inserted into the fastener hole 154 in the ring gear 52 before being inserted into the through hole 100 in the case 60.

Each member of the set of teeth 126 may have a tooth end surface 180 and a tip surface 182. The tooth end surface 180 may face toward the axis 54 and may extend from a tip surface 182 to the angled surface 130. The tooth end surface 180 may extend further toward the axis 54 or may be located closer to the axis 54 than the fastener hole 154. As is shown in FIGS. 4 and 5, the angled surface 130 may extend from the tooth end surface 180 and may be longer than the tooth end surface 180 or may have a greater length in an axial direction than the tooth end surface 180. The tooth end surface may be disposed at an oblique angle with respect to the axis 54 and the angled surface 130 in one or more configurations.

One or more fasteners 62 may couple the ring gear 52 to the case 60. Each fastener may be received in the through hole 100 of the case 60 and a corresponding fastener hole 154 of the ring gear 52. The fasteners 62 may have any suitable configuration. For example, the fasteners 62 may be configured as bolts. In such a configuration, the fastener 62 may have a head 190 and a shank 192.

The head 190 may be disposed adjacent to the mounting flange 124 and may engage the mounting flange 124.

The shank 192 may extend from the head 190 toward the ring gear 52. The shank 192 may have a smaller diameter than the head 190 and may be partially or completely threaded. The shank 192 may extend through the through hole 100 and the fastener hole 154. Moreover, the shank 192 may be spaced apart from the inner side 122. For example, the shank 192 may extend through and may protrude from the mounting flange 124 such that the inner side 122 overhangs the shank 192 in an axial direction. In addition, the inner side 122 may overhang the shank 192 in a radial direction such that at least a portion of the inner side 122 may be located closer to the axis 54 than at least a portion of the shank 192.

Referring to FIG. 5, a nut 194 may optionally be provided to help secure the fastener 62. The nut 194 may be disposed on an opposite side of the mounting flange 124 from the head 190 and may engage the mounting flange 124. The nut 194 may have a threaded hole that may receive the shank 192 and mate with the thread on the shank 192. It is also contemplated that a nut may be provided in the configuration shown in FIG. 4 if there is sufficient clearance. In addition, the fastener hole 154 in the mounting flange 124 may not be threaded when a nut 194 is provided.

Referring to FIG. 3, the differential unit 64 may include a first gear 200, a second gear 202, a spider 204, and at least one pinion gear 206.

The first gear 200 may be disposed in the first case portion 70. For example, the first gear 200 may be at least partially disposed in the first hole 84 and may be configured to rotate about the axis 54. The first gear 200 may receive a first axle shaft 24. For example, the first gear 200 may have a spline that may mate with a corresponding spline on the first axle shaft 24 such that the first gear 200 may not rotate with respect to the first axle shaft 24. In addition, the first gear 200 may have a set of teeth that may be arranged around the axis 54 that may mate with teeth on one or more pinion gears 206.

The second gear 202 may be disposed in opposite the first gear 200 and may have a similar or identical configuration as the first gear 200. For example, the second gear 202 to may be disposed in the second hole 94 of the second case portion 72 and may be configured to rotate about the axis 54. The second gear 202 may receive a second axle shaft 24. For example, the second gear 202 to may have a spline that may mate with a corresponding spline on the second axle shaft 24 such that the second gear 202 may not rotate with respect to the second axle shaft 24. In addition, the second gear 202 may have a set of teeth that may be arranged around the axis 54 that may mate with teeth on one or more pinion gears 206.

The spider 204 may rotate about the axis 54 with the case 60. In at least one embodiment, the spider 204 may include a plurality of shafts that may be received in corresponding spider shaft holes 110 of the case 60. The shafts may rotatably support the pinion gears 206.

A pinion gear 206 may be rotatably disposed on a corresponding shaft of the spider 204. Each pinion gear 206 may be disposed in the cavity of the case 60 and may be rotatably supported or retained on a corresponding shaft with one or more fasteners, such as a washer and/or a thrust bearing. Each pinion gear 206 may include a set of teeth that mate with teeth on the first gear 200 and teeth on the second gear 202.

Referring to FIGS. 1 and 3, the axle shafts 24 may transmit torque from the differential assembly 22 to corresponding traction wheel assemblies. Each axle shaft 24 may extend through a different arm portion 42 of axle housing 30. The axle shafts 24 may extend along and may be rotated about the axis 54 by the differential assembly 22. Each axle shaft 24 may have a first end and a second end. The first end may be coupled to the differential assembly 22. The second end may be disposed opposite the first end and may be operatively connected to a wheel end assembly that may have a wheel hub that may support a wheel. As shown in FIG. 1, an axle flange 210 may be disposed proximate the second end of the axle shaft 24 and may facilitate coupling of the axle shaft 24 to the wheel hub.

The differential assembly and ring gear configurations previously discussed may help increase the length of the teeth of the ring gear without increasing the outside diameter of the ring gear as previously discussed. This may help increase the surface area of the teeth of the ring gear, may allow the surface area of the drive pinion teeth to be increased, may help increase the amount of torque that can be transmitted to the differential from a drive pinion, and may help improve the durability of the ring gear. In addition, the configurations previously discussed may allow the ring gear to be provided with through holes for receiving fasteners rather than blind threaded holes that are more difficult and costlier to manufacture. Moreover, the present invention may be employed without changing or enlarging the case of the differential or the axle housing, thereby helping reduce associated costs and weight.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A differential assembly comprising:
a case that is rotatable about an axis and that has a through hole;
a ring gear that is mounted to the case, the ring gear including:
a mounting flange that engages the case, the mounting flange including a fastener hole that is a through hole that extends through the mounting flange; and
a set of teeth arranged around the axis, wherein the set of teeth extends from an inner side that faces toward the axis toward an outer side that faces away from the axis such that the set of teeth overhangs the fastener hole and the inner side is located closer to the axis than at least a portion of the fastener hole; and
a fastener that is received in the through hole of the case and the fastener hole, wherein the fastener couples the ring gear to the case.

2. The differential assembly of claim 1 wherein the inner side extends continuously around the axis.

3. The differential assembly of claim 1 wherein the set of teeth extends from the inner side to the outer side.

4. The differential assembly of claim 1 wherein the fastener hole is a threaded through hole.

5. The differential assembly of claim 1 wherein the fastener hole extends along a fastener hole axis and the fastener hole axis is located closer to the axis than the inner side.

6. The differential assembly of claim 1 wherein the fastener hole extends along a fastener hole axis and the inner side is located closer to the axis than the fastener hole axis.

7. The differential assembly of claim 6 wherein the fastener hole axis is disposed parallel to the axis.

8. The differential assembly of claim 1 wherein the fastener has a head and a shank that extends from the head, wherein the head is disposed adjacent to the mounting flange and the shank extends through the through hole and the fastener hole.

9. The differential assembly of claim 8 wherein the shank is spaced apart from the inner side.

10. The differential assembly of claim 8 wherein the shank extends through and protrudes from the mounting flange such that the inner side overhangs the shank.

11. The differential assembly of claim 10 wherein the inner side is located closer to the axis than at least a portion of the shank.

12. A differential assembly comprising:
a case that is rotatable about an axis and that has a through hole;
a ring gear that is mounted to the case, the ring gear including:

a mounting flange that engages the case, the mounting flange including a fastener hole; and a set of teeth that are arranged around the axis, wherein the set of teeth extends from an inner side that faces toward the axis toward an outer side that faces away from the axis and the set of teeth overhangs the fastener hole such that the set of teeth extends further toward the axis than at least a portion of the fastener hole; and a fastener that is received in the through hole and the fastener hole, wherein the fastener couples the ring gear to the case and has a shank that extends through and protrudes from the mounting flange such that the inner side overhangs the shank.

13. The differential assembly of claim 12 wherein the mounting flange has a first side that faces toward the set of teeth and a second side that is disposed opposite the first side and that engages the case, and the ring gear has an angled surface that faces toward the axis and extends an oblique angle with respect to the axis and the first side.

14. The differential assembly of claim 13 wherein the set of teeth overhangs the fastener hole in a manner that prevents the fastener from being inserted into the fastener hole before being inserted into the through hole.

15. The differential assembly of claim 13 wherein the angled surface has a first end that is disposed closest to the set of teeth and a second end that is disposed closest to the mounting flange, wherein the first end is disposed closer to the axis than the second end.

16. The differential assembly of claim 15 wherein the second end is located at the first side.

17. The differential assembly of claim 15 wherein each member of the set of teeth has a tooth end surface that faces toward the axis and extends from a tip surface to the angled surface, wherein the tooth end surface extends further toward the axis than the fastener hole.

18. The differential assembly of claim 15 further comprising an intermediate surface that extends from the first side to the angled surface.

19. The differential assembly of claim 18 wherein the intermediate surface is disposed parallel to the axis.

20. The differential assembly of claim 12 wherein a nut receives and mates with a thread on the shank of the fastener.

21. A differential assembly comprising:

a case that is rotatable about an axis and that has a through hole;

a ring gear that is mounted to the case, the ring gear including;

a mounting flange that engages the case, the mounting flange including a fastener hole and a first side; and a set of teeth that are arranged around the axis, wherein the set of teeth overhangs the fastener hole such that the set of teeth extends further toward the axis than at least a portion of the fastener hole and each member of the set of teeth has a tooth end surface that faces toward the axis and extends from a tip surface to an angled surface that faces toward the axis and extends an oblique angle with respect to the axis and the first side, wherein the tooth end surface extends further toward the axis than the fastener hole, the first side faces toward the set of teeth, and the angled surface extends further in an axial direction than the tooth end surface; and a fastener that is received in the through hole and the fastener hole, wherein the fastener couples the ring gear to the case.

\* \* \* \* \*